United States Patent
Vassilovski

(10) Patent No.: US 7,343,154 B2
(45) Date of Patent: Mar. 11, 2008

(54) APPARATUS AND METHOD TO DETERMINE DIALING PREFIXES FOR CALL ORIGINATION TO A TELEPHONE NUMBER

(75) Inventor: Dan Vassilovski, Del Mar, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 600 days.

(21) Appl. No.: 09/739,922

(22) Filed: Dec. 19, 2000

(65) Prior Publication Data

US 2002/0077090 A1    Jun. 20, 2002

(51) Int. Cl.
*H04M 3/42* (2006.01)
*H04M 1/00* (2006.01)
*H04M 11/00* (2006.01)

(52) U.S. Cl. .............. 455/417; 455/416; 379/93.21; 379/158; 379/205.01; 379/207.01

(58) Field of Classification Search .......... 455/401, 455/417, 564, 416; 370/312, 355, 352; 379/18, 379/156, 221.01, 221.14, 221.02, 211.01, 379/551.1, 93.21, 158, 207.01, 205.01
See application file for complete search history.

(56) References Cited

U.S. PATENT DOCUMENTS

| | | | | |
|---|---|---|---|---|
| 4,490,583 A * | 12/1984 | Bednarz et al. | ............ | 379/158 |
| 5,764,731 A * | 6/1998 | Yablon | .................... | 379/88.15 |
| 5,896,565 A * | 4/1999 | Miller | ..................... | 455/404.1 |
| 6,035,026 A * | 3/2000 | Kim | ....................... | 379/202.01 |
| 6,169,799 B1* | 1/2001 | McIntosh | ............... | 379/355.01 |
| 6,360,108 B1* | 3/2002 | Rogers | ........................ | 455/564 |
| 6,400,712 B1* | 6/2002 | Phillips | ..................... | 370/355 |
| 6,445,694 B1* | 9/2002 | Swartz | ....................... | 370/352 |
| 6,449,475 B1* | 9/2002 | Chinnaswami | ............. | 455/415 |
| 6,477,150 B1* | 11/2002 | Maggenti et al. | .......... | 370/312 |
| 6,505,040 B1* | 1/2003 | Kim | ........................... | 455/416 |
| 6,574,467 B1* | 6/2003 | Jonsson | ................... | 455/414.1 |
| 6,671,272 B2* | 12/2003 | Vaziri et al. | ................ | 370/352 |
| 6,804,338 B1* | 10/2004 | Chen | .................... | 379/142.08 |
| 6,963,640 B1* | 11/2005 | Manning | ............... | 379/355.08 |
| 2002/0137549 A1* | 9/2002 | Porter | ........................ | 455/564 |
| 2002/0146111 A1* | 10/2002 | Hayashi | ................ | 379/355.08 |
| 2003/0190037 A1* | 10/2003 | Hruska | .................. | 379/355.01 |

* cited by examiner

*Primary Examiner*—Fan Tsang
*Assistant Examiner*—Lisa Hashem
(74) *Attorney, Agent, or Firm*—Sandip S. Minhas; Abdollah Katbab; Tom Rouse

(57) ABSTRACT

In a communication device operable in at least two states, a method of transitioning between a call in a first state and a second state, each state having an associated number, each number having a prefix portion and a suffix portion, the call having at least one called party and a calling party is claimed. A party requests a change of state. The called party sends at least the suffix portion of the number corresponding to the second state to the calling party. The calling party compares the number corresponding to the first state with the number corresponding to the second state. The calling party appends the prefix portion of the number corresponding of the first state with the suffix portion of the number corresponding to the second state, and establishes a new call using the number corresponding to the second state.

50 Claims, 4 Drawing Sheets

APPARATUS AND METHOD TO DETERMINE DIALING PREFIXES FOR CALL ORIGINATION TO A TELEPHONE NUMBER

BACKGROUND OF THE INVENTION

I. Field of the Invention

The present invention relates to transitioning between states in a communications device. More specifically, the invention relates to transitioning between a first state and second state without having to know the dialing prefixes for the caller in the second state.

II. Related Art

With the growth in communications and mobility of people in today's society, the number of communications devices is growing exponentially. Along with the growth of communications devices, more and more numbers (such as telephone numbers or other address identifiers) are needed for these devices. Some devices are operable in more than one state—that is, having more than one number. In accordance with devices being operable in more than one state, there is the desire to transition between states. However, each party in communication with one another may not know each other's alternate numbers. Also, depending upon location, regional codes may need to be entered to make a connection. A given party may not know the regional codes required for a connection in a second state. What is needed is the ability to transition between states even if a party may not know the alternate number or its regional codes.

SUMMARY OF THE INVENTION

The apparatus and method described and embodying the invention has the ability to transition between states despite a party not knowing the other party's alternate number or its regional code.

In a communication device operable in at least two states, a method of transitioning between a call in a first state and a second state, each state having an associated number, each number having a prefix portion and a suffix portion, the call having at least one called party and a calling party is described. A party requests a change of state, and then sends at least the suffix portion of the number corresponding to the second state to the calling party. The calling party then compares the number corresponding to the first state with the number corresponding to the second state. The calling party then appends the prefix portion of the number corresponding of the first state with the suffix portion of the number corresponding to the second state. A new call is then established using the number corresponding to the second state. The method may further comprise storing the number corresponding to the first state in memory associated with the calling party. Also, the method may first have an established call in the first state prior to requesting a change of state.

An apparatus configured to transition between a first state and a second state during a call, each state having an associated number, each number having a prefix portion and a suffix portion, the call having at least one called party and a calling party, is also described. A receiver is configured to receive a request of a change of state. A comparer is configured to compare the number corresponding to the first state with the number corresponding to the second state. A grouper is coupled to the comparer and configured to append the prefix portion of the number corresponding of the first state with the suffix portion of the number corresponding to the second state. An establisher is configured to establish a new call using the number corresponding to the second state.

It is an aspect of the invention to allow a communication device to determine the dialing prefixes needed for call origination.

It is an aspect of the invention to allow a user to establish a call in an alternate state without having to have knowledge of regional codes associated with the number in the alternate state.

It is another aspect of the invention to allow any user in a call to request the change in transition from a first state to a second state.

BRIEF DESCRIPTION OF THE DRAWINGS

The features, objects, and advantages of the invention will become more apparent from the detailed description set forth below when taken in conjunction with the drawings in which like reference characters identify correspondingly throughout and where in.

DETAILED DESCRIPTION OF THE PREFERRED EMBODIMENTS

Figure 1:
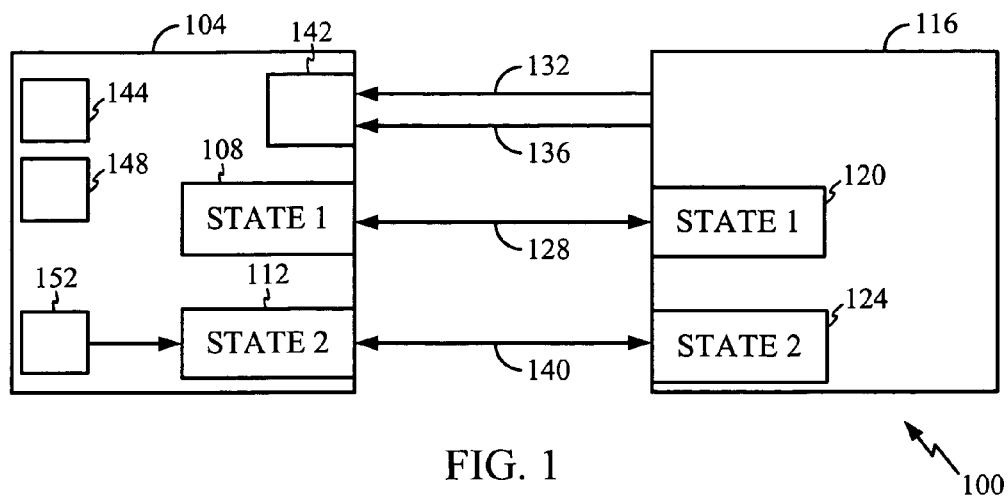
FIG. 1 is a diagram illustrating a call transitioning between a first state and a second state.

FIG. 1 illustrates a call between two parties and transitioning between a first state and a second state 100. A calling party 104 has at least two states, a first state 108 and a second state 112. Similarly, a called party 116 has a first state 120 and a second state 124. It is contemplated that either party may have any number of states. The logic of the apparatus and method described carries through regardless of the number of states of each party. In an embodiment, an established channel 128 exists between calling party 104 and called party 116. The established channel 128 may be any type of communication path, such as a voice channel, a data channel, a clear channel, a secure channel, an asynchronous data channel, or any other type of communications channel between communication devices.

Calling party 104 and called party 116 may be using any type of communications device, such as a lined telephone, a wireless telephone, a pager, a personal communication device such as a Palm Pilot TM, or any other communications device on any type of communications channel. Communication channels may be wire-line, PSTN, or wireless standards such as Code Division Multiple Access (CDMA), CDMA2000, Wideband Code Division Multiple Access (WCDMA), Time Division Synchronized Code Division Multiple Access (TD-SCDMA) Global System for Mobile Communications (GSM), Time Division Multiple Access (TDMA) or any like communications systems.

Each state (108, 112, 120, 124) has an associated number. For example, the first state 108 of the calling party 104 has an associated telephone number that is different than a telephone number associated with the second state 112. Similarly, first state 120 of called party 116 has a number that is different than second state 124 of called party 116. Each number of each party has associated codes, such as regional and area codes, which may be described as prefix portions (regional codes) and suffix portions (actual telephone number). For example, a caller in the United States dialing internationally dials a number of the form "011—country code —city code—number". Thus, if the calling party 104 is in San Diego, Calif. of the United States, and called party 116 is in London, England, the number of the calling party 104 in San Diego may be 00-1-858-123-4567 and the number of called party 116 in London may be 011-41-171-123-4567. Thus, the prefix portion of the calling party 104 is "00-1" and the suffix portion is "858-123-4567". Similarly, the prefix portion of the called party 116 is "011-41-171" and the suffix portion is "123-4567".

As stated above, this embodiment assumes that an established call exists between first state 108 of calling party 104 and first state 120 of called party 116. Also assume that the called party 116 wants to transition to the second state: that is, establish a channel or a new call between second state 112 of calling party 104 and second state 124 of called party 116. If the calling party 104 is located in the San Diego and the called party 116 is located in London, the calling party 104 has different dialing requirements (regional codes or prefixes) to reach the called party 116 than the called party 116 has to reach the calling party 104. But, if the called party 116 wishes to transition to the second state, and doesn't know calling party's 104 number associated with the second state 112, called party 116 has to receive the number associated with second state 112 from calling party 104. Similarly, the calling party 104 may not know the dialing prefixes necessary when the calling party 104 is calling from abroad. However, since calling party 104 originated the established call in the first state, calling party 104 knows, or has internal or attached memory having, the required dialing prefixes. Thus, regardless of whether the calling party 104 or the called party 116 requests transition to an alternate state, the calling party 104 originates the transition between the first state and the second state.

For example, called party 116 issues a request to transition 132 from the first state (108 and 120) to the second state (112 and 124). Calling party 104 has a receiver 142 to receive the request. After the request to transition 132, the called party 116 sends the calling party 104 its number 136 associated with its second state 124. The number 136, or suffix portion, does not have the regional codes, or prefix portion, needed to allow calling party 104 to originate a new call to called party 116. Upon receipt of the request 132 and the associated number 136 by the receiver 142, calling party 104 uses an internal comparer 144 to make a comparison of the prefix portion and number (suffix portion) associated with the first state 120 with the number (suffix portion) associated with the second state 124. Again, since the calling party 104 initiated the initial established call between the first state 108 and 120, and knows, or has access to, the dialing prefixes necessary for transition into the second state, or originate a new call using the number of the second state. Calling party 104 then uses a grouper 148 to attach or associate the prefix portion associated with the number from the first state 120 to the suffix portion associated with the second state 124. Alternatively, the grouper 148 may strip the number, or suffix, of the first state and attach the number, or suffix, of the second state. Accordingly, calling party 104 has constructed the full numerical sequence; that is, the prefix portion and the suffix portion, necessary to establish a call in the second state 140. An establisher 152 then establishes the connection in the second state 140.

Figure 2:
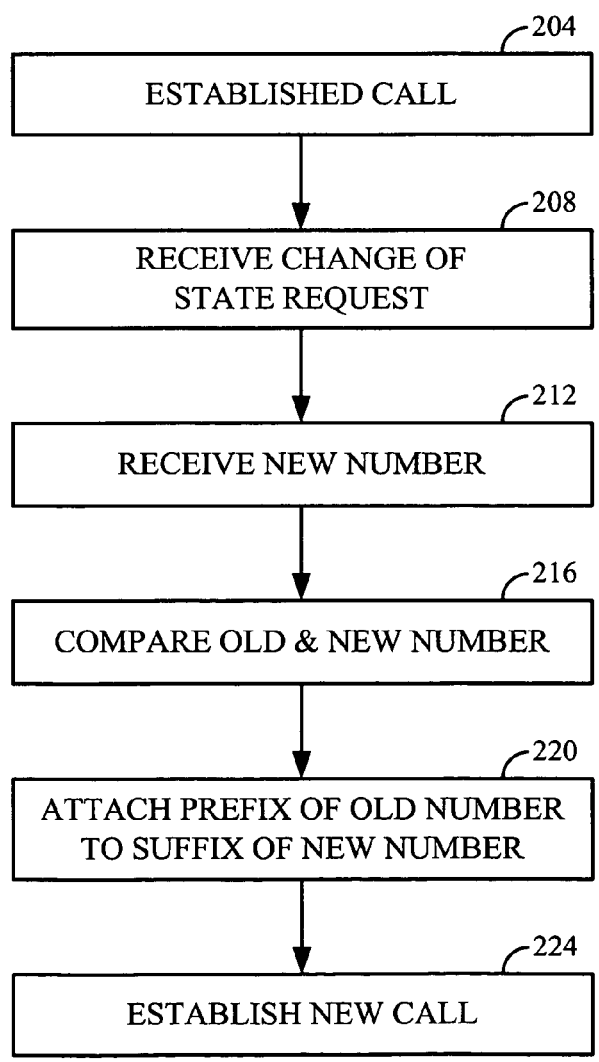
FIG. 2 is a flowchart illustrating the steps taken by the calling party in transitioning from a first state to a second state.

FIG. 2 illustrates the process undergone by the calling party 104 in such a transition as described with the respect to FIG. 1. An established channel or call 204 is assumed. The calling party 104 receives a request 208 from called party 116 to transition to a second state. Calling party 104 uses its receiver to receive the request 208 and to receive the called party's number 212 associated with its second state 124. The calling party 104 then, using the comparer, internally compares 216 the number associated with the first state 120 with the number associated with the second state 124. Using the grouper, calling party 104 is then able to strip 220 the number associated with first state 120, or attach the prefixes 220 from the number associated with first state 120 to the number associated with second state 124. Calling party 104 then uses its establisher to establish 224 a new call or communication channel between the second states 112 and 124.

In an embodiment, the transitioning described above may be used in wireless telephones, for example, in wireless data capable devices that utilize specific over the air service options for specific call types. For example, calls in one state, say voice calls, may utilize over-the-air service options designated for voice, while calls in a second state, say asynchronous data calls, utilize over-the-air service options designated for asynchronous data. Each wireless telephone has associated with it a telephone number, and each phone number is provisioned for certain specific service options. For example, a phone number may be provisioned for voice service service-options and for data service service-options. Multiple parties engaged in a voice call originated between at least two such phones may desire to transition to a data call, or vice versa. In other words, the two parties engaged in a call may want to transition between clear and secure modes.

Figure 3:
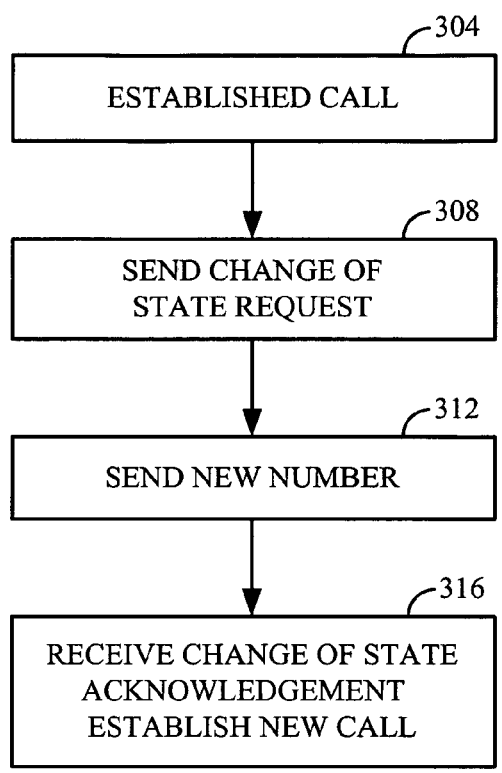
FIG. 3 is a flowchart illustrating the steps taken by the called party in transitioning between a first state and a second state.

FIG. 3 illustrates a diagram of the steps undertaken by called party 116 in transitioning between a first state and a second state. Again, it is assumed that a channel is established 304 between calling party 104 and called party 116. Called party 116 then sends a request 308 to calling party 104 to transition from the first state to the second state. The called party 116 then sends its number associated with the second state 312. After calling party 104 makes comparisons between the numbers provided by called party 116 and attaches the proper prefixes, called party 116 receives a "go to second state" request 316, thereby establishing a call in the second state.

Figure 4:
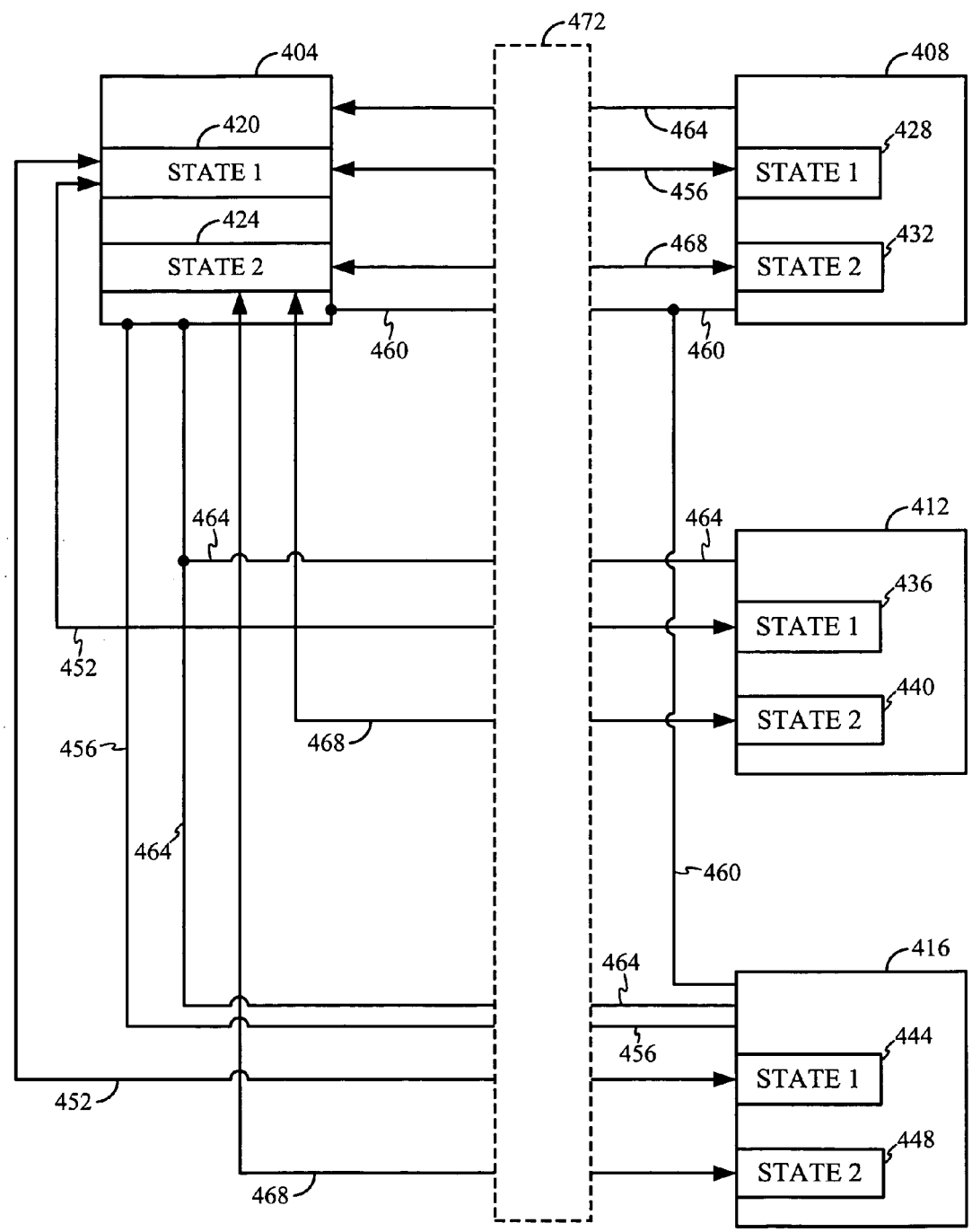
FIG. 4 is a diagram illustrating a group call transitioning between a first state and a second state.

FIG. 4 illustrates transitioning between states in a situation where there are multiple called parties 400, such as in a group communication environment. Operation of group communications systems is explained in more detail in pending U.S. patent application "Method And Apparatus For Enabling Group Communication Services In An Existing Communication System", Ser. No. 09/518,622, filed on Mar. 3, 2000, "Method And Apparatus For Participating In Group Communication Services In An Existing Communication System", Ser. No. 09/518,776, filed on Mar. 3, 2000, and "System And Method For Providing Group Communication Services In An Existing Communication System", Ser. No. 09/518,985, filed on Mar. 3, 2000.

In a group communication environment, a calling party 404 has an established group call 452 between called parties 408, 412, and 416. Called party 404 and each calling party 408, 412, and 416 each have first and second states. Calling party 404 has a first state 420 and a second state 424. Called party 408 has a first state 428 and a second state is 432. Called party 412 has a first state 436 and a second state 440. Called party 416 has a first state 444, and a second state 448.

Assume that called party 416 requests a transition 456 between each party's first state to each party's second state. The request 456 goes to calling party 404. Upon calling party 404 acknowledging the request to transition, the calling party 404 send a request to transition 460 to the members of the group call 408, 412 and 416. On receipt of the request by each of the called parties 408, 412, and 416, each called party sends 464 its number associated with its second state. Calling party 404 makes comparisons between the numbers associated with each state of each called party 408, 412, and 416 to determine the prefix portion as separated from the suffix portion. Calling party 404 then establishes a new connection 468 to each of the called parties 408, 412, and 416.

In an alternate embodiment, a communications manager 472 acts as an intermediary between calling party 404 and each of called parties 408, 412, and 416. Requests for change of state are processed through communications manager 472, and otherwise processes substantially the same as described above. Communications manager 472 may contain memory having the numbers and regional codes for all of the group members. Accordingly, wherever possible, sending of numbers of alternate states may be accomplished through communications manager 472, and not from each called party 408, 412 and 416.

Figure 5:
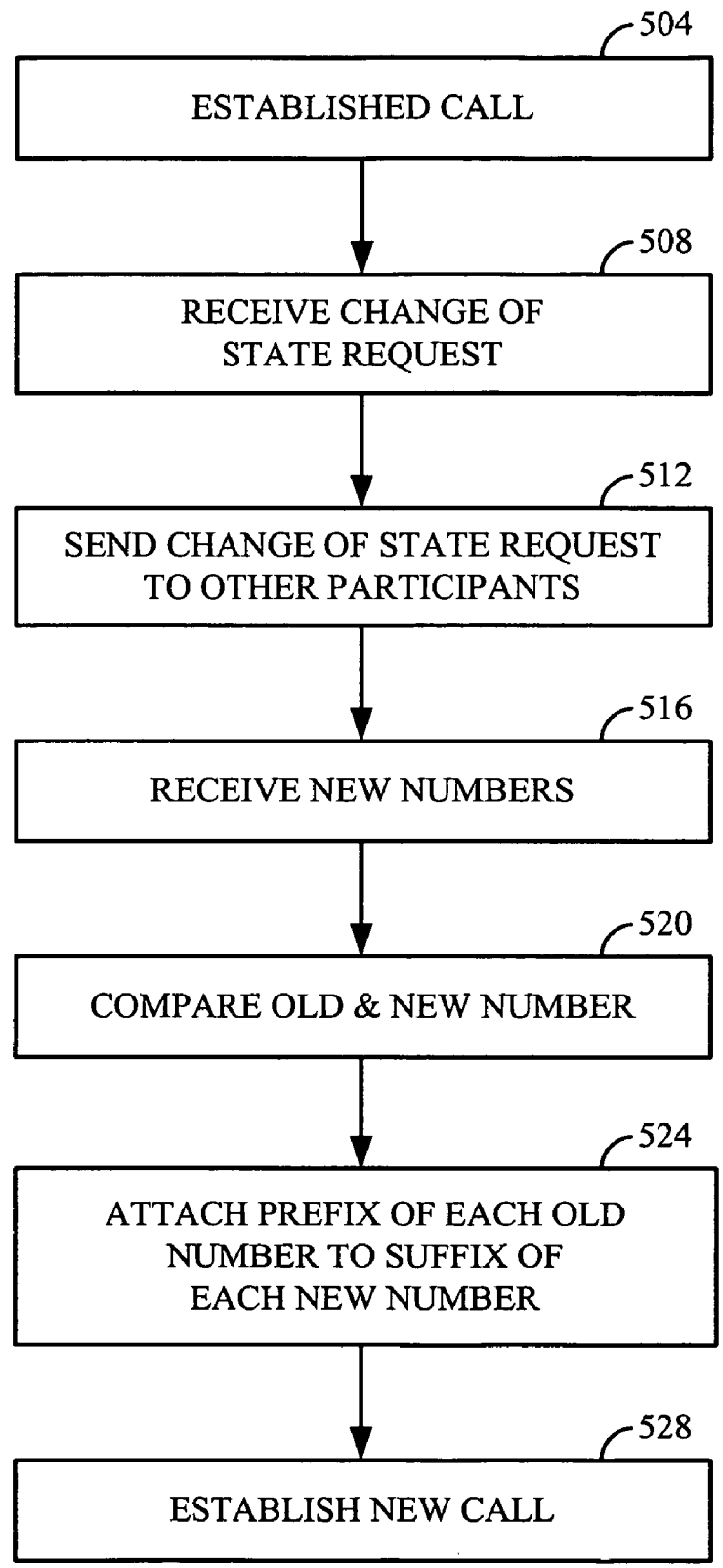
FIG. 5 is a flowchart illustrating the steps taken by the calling party in a group call in transitioning between a first state and a second state.

FIG. 5 illustrates a flowchart 500 of transitioning between states in a group call as described with the respect of FIG. 4. Assume that an established channel exists 504 between the participants of the group call. Calling party 404 receives a request to transition from one state to another 508 from one of the called parties. Calling party 404 then sends a request to each of the called parties 408, 412, and 416 for its number associated with the second state 512. Calling party 404 then receives each number 516 from each of the called parties 408, 412, and 416. In the alternate embodiment, calling party relies on communications manager 472 to acquire the alternate number, or already have the alternate number in memory. The calling party 404 then compares 520 each number associated with the first state with each number associated with the second state for each of the called parties 408, 412, and 416. In the alternate embodiment, the communications manager may make this comparison. Calling party 404 attaches 524 prefixes from the first state of each of the called parties 408, 412, 416 to the second state of each of the called parties 408, 412, and 416. The calling party 404 then establishes a new call 528 to each of the called parties 408, 412, and 416.

Figure 6:
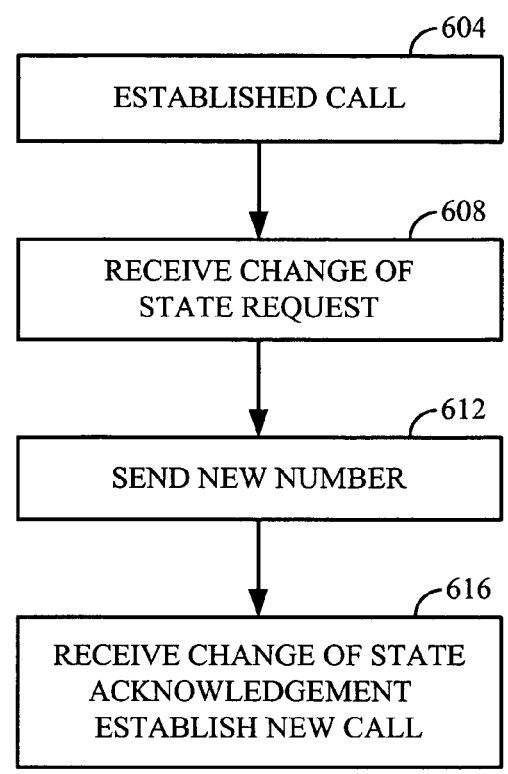
FIG. 6 is a flowchart illustrating the steps taken by the called party in a group call in transitioning between a first state and a second state.

FIG. 6 illustrates the steps undergone by each of the called parties in a group call transitioning between a first state and a second state. It is assumed that an established channel exists 604. For any called party that did not request to transition between states, the first notification to transition is received from the calling party 404. This is illustrated as step 608 in FIG. 6. The called party then sends its number 612 associated with the second state. After the calling party 404 receives the numbers associated with each second state and attaches the prefixes previously known from the number associated with the first state, each called party receives a request to establish a new channel 616.

The previous description of the embodiments as provided to enable any person skilled in the art to make or use the invention. The various modifications to these embodiments will be readily apparent to those skilled in the art, and the generic principals to find here and may be applied to other embodiments with out the use of the inventive faculty. Thus, the invention is intended to be limited to the embodiments shown herein but is to be accorded the widest scope consistent with the principals and novel features disclosed herein.

The invention claimed is:

1. In a communication device operable in at least two states, a method of transitioning a call from a first state to a second state, each state having an associated number, each number having a prefix portion and a suffix portion, the call being associated with at least one called device and a calling device, the method comprising:

requesting a change of state;

sending at least the suffix portion of the number corresponding to the second state to the calling device;

comparing the number corresponding to the first state with the number corresponding to the second state;

appending the prefix portion of the number corresponding to the first state with the suffix portion of the number corresponding to the second state;

establishing a new connection between the called device and the calling device using the number corresponding to the second state; and transitioning the call, based on the new connection, from the first state to the second state, wherein transitioning further comprises transitioning between a clear state and a secure state.

2. The method as set forth in claim 1, further comprising storing the number corresponding to the first state in memory associated with the called device.

3. The method as set forth in claim 1, further comprising establishing a call in the first state prior to requesting a change of state.

4. The method as set forth in claim 1, wherein the prefix portion comprises regional codes and the suffix portion comprises the telephone number.

5. The method as set forth in claim 1, wherein the first state is the clear state and the second state is the secure state.

6. The method as set forth in claim 1, wherein the first state is the secure state and the second state is the clear state.

7. The method as set forth in claim 1, wherein the first state is a voice state and the second state is a data state.

8. The method as set forth in claim 1, wherein the first state is a data state and the second state is a voice state.

9. The method as set forth in claim 1, wherein the first state is a first phone number and the second state is a second phone number.

10. The method as set forth in claim 1, wherein the calling device and the at least one called device are on a wireless call.

11. In a communication device operable in at least two states, a method of transitioning a call from a first state to a second state, each state having an associated number, each number having a prefix portion and a suffix portion, the call being associated with at least one called device and a calling device, the method comprising:

receiving a request for a change of state;

receiving at least the suffix portion of the number corresponding to the second state from the called device;

comparing the number corresponding to the first state with the number corresponding to the second state;

appending the prefix portion of the number corresponding to the first state with the suffix portion of the number corresponding to the second state;

establishing a new connection between the called device and the calling device using the number corresponding to the second state; and transitioning the call, based on the new connection, from the first state to the second state, wherein transitioning further comprises transitioning between a clear state and a secure state.

12. The method as set forth in claim 11, further comprising storing the number corresponding to the first state in memory associated with the called device.

13. The method as set forth in claim 11, further comprising establishing a call in the first state prior to receiving a request for a change of state.

14. The method as set forth in claim 11, wherein the prefix portion comprises regional codes and the suffix portion comprises the telephone number.

15. The method as set forth in claim 11, wherein the first state is the clear state and the second state is the secure state.

16. The method as set forth in claim 11, wherein the first state is the secure state and the second state is the clear state.

17. The method as set forth in claim 11, wherein the first state is a voice state and the second state is a data state.

18. The method as set forth in claim 11, wherein the first state is a data state and the second state is a voice state.

19. The method as set forth in claim 11, wherein the first state is a first phone number and the second state is a second phone number.

20. The method as set forth in claim 11, wherein the calling device and the at least one called device are on a wireless call.

21. In a communication device operable in at least two states, a method of transitioning between a call from a first state to a second state, each state having an associated number, each number having a prefix portion and a suffix portion, the call being associated with at least one called device and a calling device, the method comprising:

requesting a change of state;
sending at least the suffix portion of the number corresponding to the second state to the calling device;
comparing the number corresponding to the first state with the number corresponding to the second state; and
receiving a request to establish a new connection from the calling device using a number generated by appending the prefix portion of the number corresponding to the first state with the suffix portion of the number corresponding to the second state; and
transitioning the call, based on the new connection, from the first state to the second state, wherein transitioning further comprises transitioning between a clear state and a secure state.

22. The method as set forth in claim 21, further comprising storing the number corresponding to the first state in memory associated with the called device.

23. The method as set forth in claim 21, further comprising establishing a call in the first state prior to requesting a change of state.

24. The method as set forth in claim 21, wherein the prefix portion comprises regional codes and the suffix portion comprises the telephone number.

25. The method as set forth in claim 21, wherein the first state is the clear state and the second state is the secure state.

26. The method as set forth in claim 21, wherein the first state is the secure state and the second state is the clear state.

27. The method as set forth in claim 21, wherein the first state is a voice state and the second state is a data state.

28. The method as set forth in claim 21, wherein the first state is a data state and the second state is a voice state.

29. The method as set forth in claim 21, wherein the first state is a first phone number and the second state is a second phone number.

30. The method as set forth in claim 21, wherein the calling device and the at least one called device are on a wireless call.

31. In a communication device operable in at least two states, a method of transitioning between a call from a first state to a second state, each state having an associated number, each number having a prefix portion and a suffix portion, the call being associated with at least one called device and a calling device, the method comprising:

receiving a request for a change of state;
sending at least the suffix portion of the number corresponding to the second state to the calling device;
comparing the number corresponding to the first state with the number corresponding to the second state; and
receiving a request to establish a new connection from the calling device using a number generated by appending the prefix portion of the number corresponding to the first state with the suffix portion of the number corresponding to the second state; and
transitioning the call, based on the new connection, from the first state to the second state, wherein transitioning further comprises transitioning between a clear state and a secure state.

32. The method as set forth in claim 31, further comprising storing the number corresponding to the first state in memory associated with the called device.

33. The method as set forth in claim 31, further comprising establishing a call in the first state prior to receiving a request for a change of state.

34. The method as set forth in claim 31, wherein the prefix portion comprises regional codes and the suffix portion comprises the telephone number.

35. The method as set forth in claim 31, wherein the first state is the clear state and the second state is the secure state.

36. The method as set forth in claim 31, wherein the first state is the secure state and the second state is the clear state.

37. The method as set forth in claim 31, wherein the first state is a voice state and the second state is a data state.

38. The method as set forth in claim 31, wherein the first state is a data state and the second state is a voice state.

39. The method as set forth in claim 31, wherein the first state is a first phone number and the second state is a second phone number.

40. The method as set forth in claim 31, wherein the calling device and the at least one called device are on a wireless call.

41. An apparatus configured to transition between a first state and a second state during a call, each state having an associated number, each number having a prefix portion and a suffix portion, the call being associated with at least one called device and a calling device, the apparatus comprising:

a receiver configured to receive a request of a change of state, wherein the receiver is further configured to receive the number corresponding to the second state from the called device;
a comparer configured to compare the number corresponding to the first state with the number corresponding to the second state;
a grouper coupled to the comparer configured to append the prefix portion of the number corresponding to the first state with the suffix portion of the number corresponding to the second state; and
an establisher configured to establish a new connection using the number corresponding to the second state, wherein the establisher is further configured to transition the call, based on the new connection, from the first state to the second state, wherein the establisher further transitions the call between a clear state and a secure state.

42. The apparatus set forth in claim 41, further comprising a storage device configured to store the number corresponding to the first state in memory associated with the called device.

43. The apparatus as set forth in claim 41, wherein the establisher is configured to establish a call in the first state prior a change of state.

44. The apparatus as set forth in claim 41, wherein the prefix portion comprises regional codes and the suffix portion comprises the telephone number.

45. The apparatus as set forth in claim 41, wherein the first state is the clear state and the second state is the secure state.

46. The apparatus as set forth in claim 41, wherein the first state is the secure state and the second state is the clear state.

47. The apparatus as set forth in claim 41, wherein the first state is a voice state and the second state is a data state.

48. The apparatus as set forth in claim 41, wherein the first state is a data state and the second state is a voice state.

49. The apparatus as set forth in claim 41, wherein the first state is a first phone number and the second state is a second phone number.

50. The apparatus as set forth in claim 41, wherein the calling device and the at least one called device are on a wireless call.

* * * * *